Jan. 15, 1952     J. B. WALKER     2,582,728
INDICATOR FOR THE BLIND
Filed Feb. 4, 1947     2 SHEETS—SHEET 1
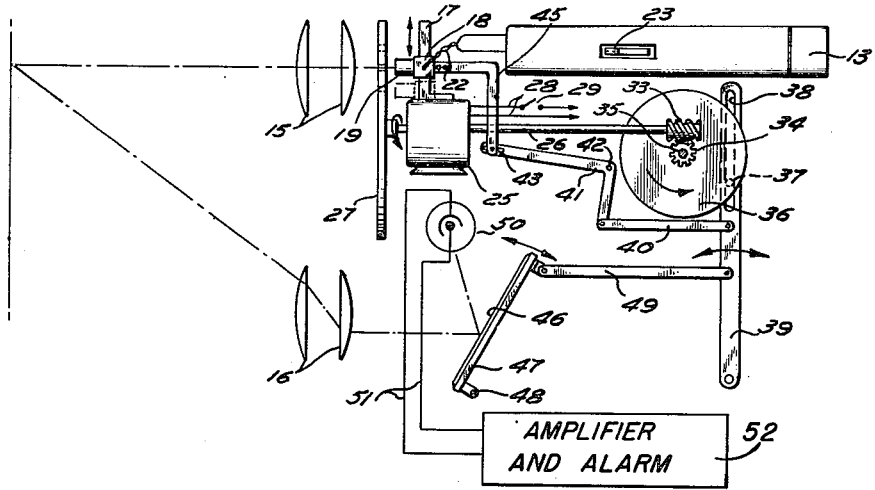
Fig. 1.
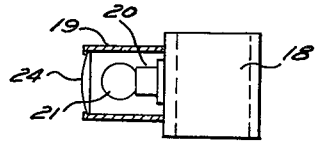
Fig. 7.
Fig. 2.
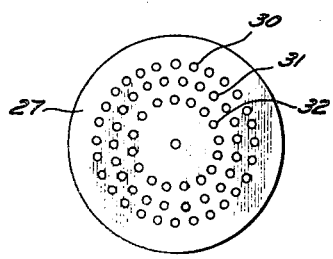
Fig. 3.
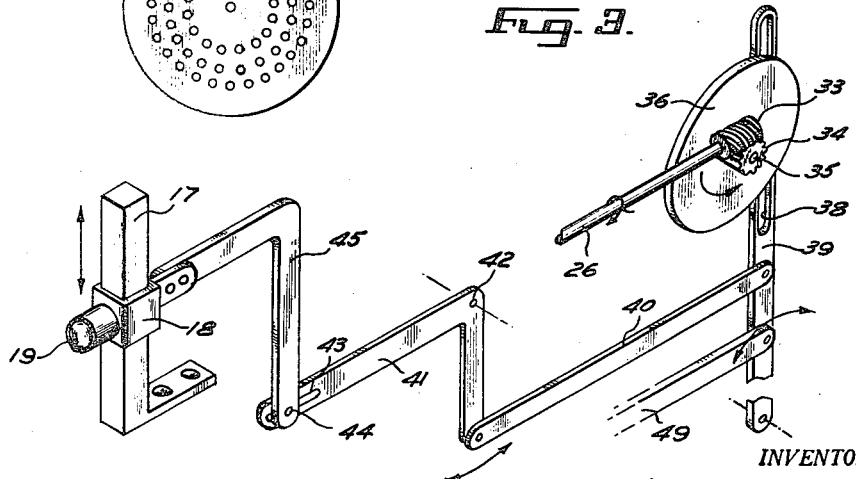
INVENTOR.
JOSEPH B. WALKER
BY
Westall & Westall
ATTORNEYS Jan. 15, 1952 J. B. WALKER 2,582,728
INDICATOR FOR THE BLIND
Filed Feb. 4, 1947 2 SHEETS—SHEET 2
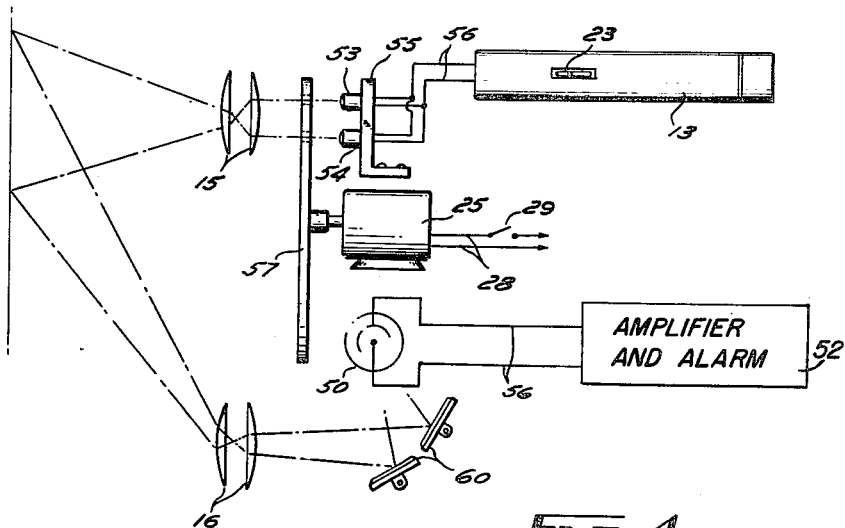
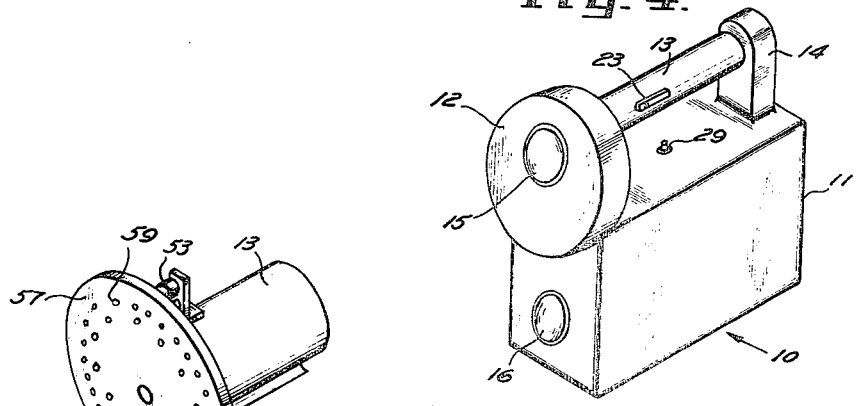
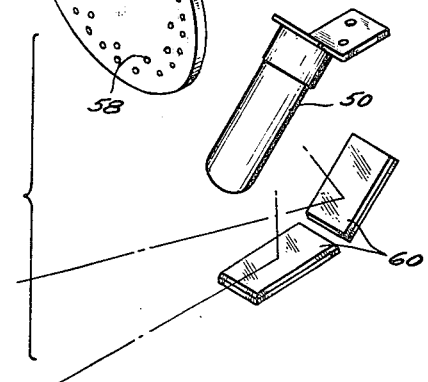
INVENTOR.
JOSEPH B. WALKER
BY
Westall & Westall
ATTORNEYS Patented Jan. 15, 1952

2,582,728

UNITED STATES PATENT OFFICE 2,582,728

INDICATOR FOR THE BLIND

Joseph B. Walker, Hollywood, Calif.

Application February 4, 1947, Serial No. 726,361

3 Claims. (Cl. 177—352)

This invention relates to indicators for the blind, embodied in a portable unit and consisting essentially of an audible alarm adopted for energization in response to operation of optical means which contemplate the direction to and reflection of a light beam from an object to be detected. This application is a continuation in part of my co-pending applications, Serial No. 566,521, filed December 4, 1944, and issued as Patent No. 2,444,235, and Serial No. 697,568, filed September 17, 1946, and issued as Patent No. 2,506,946.

The transmission of radiant energy for reflection by an object has heretofore been used in combination with mechanism by which such reflected energy is transformed and amplified for energization of an audible alarm or a signal in apparatus intended for the detection of such objects by blind persons. Moreover, for practical utility the combined apparatus must be of light weight and of small bulk to enable the user to carry and manipulate the unit for proper direction of the beam.

To enable the user to ascertain from the signal the size and general outline of any object detected within the effective zone of operation, the transmitted beam of energy must, of necessity, be of small cross-section, and any such beam requires constant re-direction thereof so as to quickly and continuously scan the field as the user advances. The importance of this characteristic of any practical detector is readily understood when it is appreciated that in order for such a unit to warrant the confidence of a blind user it must detect automatically or be capable of detecting, upon facile proper manipulation, all objects within a distance range of ten feet. However, the lateral and vertical scanning of the area cannot be accomplished manually with sufficient assurance to the user. In my co-pending application, Serial No. 697,568, I have disclosed a detector capable of automatically scanning the field in a vertical direction, lateral scanning being manual. The vertical location of an object detected is indicated by the pitch of the alarm signal, and in such apparatus this variation in pitch is effected electrically.

It is a principal object of the present invention to provide detector mechanism adapted to scan a field vertically with a variable pulsating or intermittent light beam and directly transpose light energy reflected from any object within the field, into a flow of electrical energy of a frequency corresponding with that of the pulsations of the light forming the beam, for the energization of an audible signal, whereby the pitch of the signal alarm is controlled optically.

More specifically, an object hereof is the provision of a portable indicator for the blind, operable to transmit either simultaneously or in continuous succession a series of individually pulsating light beams in different directions, the frequency of the pulsations of the respective beams being different to energize, upon reflection by an object or objects to which the respective beams are directed, an electrical system for producing an audible signal of correspondingly different pitches by which the user is instantly advised of the location of the object from which the effective light beam was initially reflected with respect to the unit and the other light beams.

Another and highly important object is to provide in combination a movable light source and a high curvature lens to concentrate light rays emitted from the source upon a second lens assembly adapted to deflect the rays in a vertical plane, the slight spacing of the lenses permitting wide variation in the angle of deflection of the beam incident to relatively slight vertical movement of the light source with respect to the lens assembly.

As will be obvious to those of skill in the art from a reading of the following description numerous advantages of the present equipment are derived from the simplicity of construction of the apparatus, its ease of operation, maximum efficiency and the protection which it affords to the user.

In the drawings:

Fig. 1 is a diagrammatic view of one embodiment of my invention utilizing a single movable light source and a complementary mechanically shifted mirror;

Fig. 2 is a plan view of the disk by which the light beam is variously interrupted in accordance with the alignment of the light source therewith;

Fig. 3 is an enlarged fragmentary perspective view of the actuating mechanism for shifting the light source and mirror synchronously;

Fig. 4 is a diagrammatic view of a second embodiment of my invention having a multiple light source;

Fig. 5 is a perspective view of the case for the mechanism of either Figs. 1 to 3, or Figs. 4 and 6;

Fig. 6 is an enlarged perspective view of the light source, interrupter therefor, photo-electric tube, and mirror assembly comprising the principal elements of the embodiment of the invention shown in Fig. 4;

Fig. 7 is an enlarged elevation of one of the light sources employed in each of the illustrated embodiments of my invention.

In the drawings, wherein like numerals indicate similar parts throughout the several views, 10 designates generally a casing (Fig. 5) comprising an elongated lower body section 11 in which the reflected beam-activated mechanism and alarm are housed and a head 12 superimposed upon the body 11, the head of the casing being in open communication with the body thereof. A conventional tubular flashlight battery case 13 is mounted above and in spaced, parallel relation with the top of body 11 of the casing, the opposite ends of the battery housing 13 being supported in head 12 and by a suitable mounting 14, respectively. The case 13 thus provides a handle by which the unit may be manipulated in a manner and for a purpose hereinafter described. In the forward wall of both the body of the casing and the head, a double plano-convex lens assembly is mounted, the two assemblies 15 and 16 being preferably, though not essentially, in vertical alignment.

With particular reference to the embodiment of Fig. 1: An elongated guide 17 is suitably mounted within head 12 of the casing rearwardly of, and in alignment with, the vertical diameter of the upper lens assembly 15. Slidable on and encircling guide 17 is a complementarily-formed collar 18 having a small tubular lamp housing 19 secured to its forward face. A socket 20, secured in the back of the lamp housing 19, accommodates a bulb 21 energized by a battery (not shown) housed within the case 13, through wires 22 and controlled by a switch 23 mounted on the side of the battery case where it is easily accessible for operation by the thumb of the user while he carries the unit. Over the forward end of the lamp housing 19 a high curvature lens 24 is fitted to direct a beam of light to the lens assembly 15 in a direction parallel to the axis and variably along the vertical diameter of the lens assembly in response to the vertical adjustment of collar 18 upon the guide 17.

A motor 25 is mounted in the lower body section of casing 10 with its shaft 26 disposed in the vertical plane of the guide 17 to impart rotary motion to a perforated disk 27, the upper arc of which projects into the head 12 of the casing between the light source and lens assembly. The motor 25 is energized from a source of current (not shown) through a circuit 28 in which a switch 29 is arranged. The disk 27 is formed with three annuli 30, 31 and 32 of round holes of identical diameter. The number of holes in the outer annulus 30 is greater than those comprising the intermediate annulus 31, and the latter ring of holes consists of a number correspondingly greater than that of the inner ring of holes 32, for a purpose later referred to. The upper arc of the annulus of disk 27 in which the intermediate series of holes 31 is located passes through the axis of the lens assembly. The inner and outer annuli 30 and 32 of holes are each spaced from the intermediate ring of holes 31 a distance equal to the extent of movement of the lamp assembly 19-21 from its intermediate position to the respective ends of its range of movement on guide 17. The diameter of the spot of light concentrated upon disk 27 by the lens of the lamp assembly is the same or only slightly larger than the diameter of the respective holes in the disk, whereby the holes are effective to pass substantially the entire beam of light concentrated on the disk when moved into alignment therewith. Thus with the lens 24 positioned opposite the upper arc of any one of the annuli of holes and with disk 27 rotating, the beam of light directed against the disk will be transmitted through the holes of the aligned annulus as each thereof is swung into the beam.

The lamp assembly 19-21 is reciprocated by motor 25 synchronously with the rotation of disk to align the same with the different annuli 30-32 of the holes in the disk. To this end, the shaft 26 of motor 25 is extended rearwardly through the casing 10 and carries a worm 33 on its end which is in mesh with a pinion 34 supported on a freely rotatable shaft 35 suitably journalled in the casing so as to transmit the rotary motion of the motor shaft 26 to pinion 34 and shaft 35. A disk 36, mounted on shaft 35, carries a laterally-projecting eccentric pin 37 adjacent its periphery for extension into an elongated slot 38 formed in the upper end of an arm 39. The lower end of arm 39 is suitably pivoted within the casing so as to swing forward and back in response to motivation by pin 37. Intermediate the ends of arm 39 is pivoted one end of a lever 40 having its opposite end connected to a crank 41, pivoted at 42 in the casing. The forward end of crank 41 is slotted as at 43 for flexible attachment by a pin 44 to the lower end of an angle bracket 45 secured rigidly to the rear face of collar 18 of lamp housing 19.

The light beam transmitted by the lens 24 through the inner and outer annuli 30 and 32 of holes is directed by the lens assembly 15 upwardly and downwardly, respectively, while the beam transmitted through the intermediate annulus of holes 31 passes straight through the lens assembly 15. Thus the movement of the lamp assembly 19-21 incident to actuation of motor 25 results in the direction of the beam of light to three different vertically-spaced spots located forward of the unit in the vertical plane of the lens assembly 15. Light reflected from the object to which the beams of light are directed is transmitted through the lower lens assembly 16 to a mirror 46 disposed in the casing. The mirror is mounted upon a frame 47 pivoted at 48. An arm 49 connected between the top of the mirror frame 47 and the slotted arm 39 transmits the movement of the latter to mirror 46 so as to swing the latter upon its pivot 48 synchronously with the vertical movement of the lamp assembly 19-21.

Above and forward of mirror 46 is a photo-electric tube 50 disposed to receive the reflection of the light beam from mirror 46 and thereby generate a current in a circuit 51 in which tube 50 is connected. Also connected in circuit 51 is a conventional amplifier and electrical alarm or signal mechanism generally indicated at 52, adapted to be activated by the current generated in photo-electric tube 50. The alarm comprises, preferably, an oscillator operable to audibly inform the user of the reflection of the light rays from an object to be detected. The frequency of the vibrations, as determined by the frequency of the light pulsation reflected to the photo-electric tube, accordingly indicates the relative height of the object area from which the light is reflected.

The operation of the embodiment of my invention above described is briefly as follows: The motor 25 and lamp assembly 19-21 are energized incident to closing of the switches 29 and 23, respectively. Coincidentally, the disk 27 is rotated, the lamp assembly is vertically reciprocated, and mirror 46 is oscillated in synchronism. The narrow light beam emanating from the lamp assembly 19–21 is accordingly directed alternately and continously through the different annuli 30–32 of holes in disk 27 so as to divide and direct the beam concentrated by the lens 24 successively through the holes of the three annuli in the disk to form three vertically aligned beams of light which are transmitted successively by the lens assembly 15 forward of the unit, the upper and lower beams emitted from the lamp assembly being directed by the lens assembly 15 downwardly and upwardly, respectively, so as to scan the field vertically. Any suspended object, as for example the limb of a tree or the like, in the path of a user and above the axis of the lens assembly 15 will be illuminated by the beam of light passing through the inner annulus 32 of holes in disk 27. Suspended objects lower than the effective upwardly-deflected beam of light and horizontally aligned with the unit will be spotted by the intermediate or axial beam, while those objects supported on the ground or at floor level will reflect the light of the downwardly-diverging beam transmitted through the outer ring 30 of holes in disk 27.

In accordance with the preferred construction, the lens assembly 15 is of a type adapted to direct the upper beam to a point slightly higher than the height of the average user at a distance of approximately six to eight feet, and to direct the lower beam to a point at ground level at approximately the same distance from the unit when the latter is suspended by the hand of the user at approximately hip level.

Being synchronized with the action of the lamp assembly 19–21, mirror 46 is continuously shifted to reflect each of the light beams reflected from an object detected as said beams are successively transmitted by the lens assembly 16, to the photoelectric tube 50 so as to generate direct current in the circuit 51. The alarm of assembly 52 is accordingly energized through the amplifier as will be obvious when any of the beams of light strike an object capable of reflecting a beam of sufficient intensity to energize the photo tube 50 and amplifier.

Due to the different number of holes in each of the three annuli 30–32 of disk 27, the pulsations of the light beams will vary in frequency, and, upon reflection by an object to which they are directed, the reflected light beams correspondingly vary in frequency. As a consequence, the current produced in the circuit 51 by the photo-electric tube 50 in response to each reflected beam is of different frequency so as to produce signals of different pitch identified with the respective beams. A blind user may accordingly identify by the pitch of the signal the vertical location of any object detected. It will be appreciated that any object of a size sufficient to reflect all of the beams as they are alternately and successively transmitted through the lens assemblies 15 and 16, will produce a continuous signal of an undulating pitch as the different beams of light are played upon, and reflected by it.

In the embodiment of Figs. 4 and 6 two lamp assemblies 53 and 54, identical with that of Fig. 1, are mounted upon a bracket 55 in alignment with the upper lens assembly 15 in the forward wall of the head 12, one of the lamps 53 being located a predetermined distance above the axis of the lens assembly 15, and the other of the lamps 54 being disposed an equal distance below the axis of said lens. The lamps 53 and 54 are energized by batteries (not shown) contained in the flashlight case 13 through a circuit 56 controlled by a switch 23 carried by the battery case.

Interposed between the lamp and lens assemblies 53, 54 and 15 is a disk 57 mounted upon a shaft 26 of motor 25. Disk 57 is formed with but two annuli 58 and 59 of round holes which are all of the same diameter sufficient to pass substantially all of the light of the beam concentrated by the high curvature lenses 24 of the respective lamp assemblies 53 and 54. The lengths of the radii of the respective annuli 58 and 59 of holes are equal to the distances between the motor shaft 26 and the respective lamps, whereby the inner annulus 58 of holes passes through the light beam emanating from the lower lamp 54 and the outer annulus 59 is rotated through the beam of the upper lamp 53. As the beams of light passing through the holes of the respective annuli incident to the rotation of disk 57 strike the lens assembly 15 above and below the axis thereof, they are deflected as hereinabove described to a degree sufficient to spot objects at floor level and at approximately six feet above the floor at a distance of approximately eight feet from the unit. In this respect the dual lamp and lens assemblies 53, 54 and 15 function in substantially the same manner as the corresponding elements of the embodiment first described when the lamp assembly 19–21 is in position to direct beams through the inner and outer annuli 30 and 32 of holes of disk 27, with the exception that in the present embodiment the pulsating light beams are transmitted by the lens assembly 15 simultaneously and continuously.

Any object coming within the range of either of the effective beams of light will reflect the same through the lens system 16 to one or the other of a pair of mirrors 60 mounted within the body of the casing. Mirrors 60 are individually arranged to reflect the respective beams of light to the photo-electric tube 50 connected in a circuit 51 with the amplifier and signal mechanism 52 of conventional form so as to generate a current which, upon amplification, activates the signal device. Due to the different number of holes in the two annuli 58 and 59 of disk 57, the respective beams of light flicker or pulsate at different frequencies. Thus either beam of light reflected from an object is transmitted through the lower lens assembly 16 and again reflected by one or the other of the mirrors 60 to the photo-electric tube 50 so as to generate a current in the circuit 51 corresponding in frequency with the frequency of the pulsations of the reflected beam. The signal produced is accordingly of a pitch which identifies one or the other of the beams and thereby indicates the location of the object from which one or the other of the beams is reflected.

The presence of any object coming within the range of effective operation of the unit, and which is a sufficient size to reflect both of the beams simultaneously, will be indicated audibly to the user by a sound of higher pitch than the sound resulting from reflection of either of the beams individually. To this end, the holes forming one annulus in the disk 57 are arranged with respect to the holes in the other annulus, whereby the pulsations of light forming the beam transmitted through the holes of the inner annulus 58 occur between the pulsations of light forming the beam transmitted through the holes of the outer annulus 59. That is to say, the holes forming the inner annulus 58 are spaced, preferably equidistantly, between radii of disk 57 upon which the holes of the outer annulus 59 are disposed. Due to the fact that the mirrors 60 are arranged to reflect both beams of light to the photo-electric tube whenever they are reflected by an object to be detected, the reflection of both beams simultaneously results in the direction to the photo-electric tube 50 of a continuous succession of light pulsations of equal period and higher frequency than the frequency of the pulsations comprising either one of the beams. The pulsations of the current produced in the circuit 56 by the photo-electric tube 50 will correspondingly be of greater frequency resulting, upon amplification, in a signal of higher pitch than either of the signals produced by the individual beams.

It will be appreciated that the embodiments of my invention above described are merely illustrative of two of many forms of my invention, and that modifications in size, design, shape and number and relative proportion of the parts may be made, and particularly that in the embodiment of Fig. 1 the disk 27 may be formed with a series of holes arranged spirally therein so as to transmit a continuous beam as the lamp assembly moves in one direction, or with radial slots through which a continuous beam may be projected regardless of the position of the lamp assembly 19-21, that additional lamps may be employed, and that in such embodiment each lamp or groups of lamps may be equipped with individual lens assemblies 15, and that a single mirror of a size or contour adapted to reflect each of a plurality of beams of light from an object to the photo-electric tube 50 may be utilized, without departing from the spirit of my invention as defined in the appended claims, wherein the term "photo-electric tube" is synonymous with the term "photo-electric cell."

What I claim and desire to secure by Letters Patent is:

1. In a device of the character described, means including a light source to direct a beam of light in a predetermined direction, a lens assembly interposed in said beam of light, means to shift said first-named means relative to said lens assembly to divide said beam of light and direct separate beams of light eccentrically through said lens assembly, electrical means to produce an audible signal actuated in response to a pulsating current, means to intermit said light beams at different frequency, and means activated by said light beams to energize said electrical means to produce sounds of different frequency corresponding to the frequencies of the pulsations of said respective light beams.

2. In a device of the character described, means including a light source to direct a beam of light in a predetermined direction, a lens assembly, means to reciprocate said first-named means relative to said lens assembly in a diametric plane of the latter to direct a light beam alternately in two directions, means to intermit said light beam when projected in one direction at a predetermined constant frequency and to intermit said beam at a different frequency when projected in a different direction, and means including a signal energized by said light beam when reflected thereto.

3. In a device of the character described, means including a light source to form a light beam, a lens assembly interposed in said light beam, a rotatable element interposed in said light beam having two annuli of holes therein, the number of holes in one annulus being different from the number of holes in the other annulus, means to move said first-named means to direct said beam alternately through said respective annuli of holes in said disk when the latter is rotated, and means actuated by said light beam when reflected thereto to produce an audible signal varying in frequency with the shifting of said first-named means.

JOSEPH B. WALKER.

REFERENCES CITED

The following references are of record in the file of this patent:

UNITED STATES PATENTS

| Number | Name | Date |
|---|---|---|
| 1,820,357 | Lindstrom | Aug. 25, 1931 |
| 1,954,204 | Hayes | Apr. 10, 1934 |
| 2,081,134 | Buckley | May 25, 1937 |
| 2,216,716 | Withem | Oct. 1, 1940 |
| 2,237,193 | Mobsby | Apr. 1, 1941 |
| 2,297,534 | Brulin | Sept. 29, 1942 |
| 2,350,820 | Rettinger | June 6, 1944 |
| 2,365,580 | Murcek | Dec. 19, 1944 |
| 2,379,496 | Saunier | July 3, 1945 |
| 2,468,042 | Cranberg | Apr. 26, 1949 |

OTHER REFERENCES

Electronics, publication, March 1946 (pp. 116-119).